(12) United States Patent
Cho et al.

(10) Patent No.: US 7,430,710 B2
(45) Date of Patent: *Sep. 30, 2008

(54) METHOD AND SYSTEM FOR FACILITATING INFORMATION EXCHANGE

(75) Inventors: Charles J. Cho, Huntington, CT (US); Perlie E. Voshell, Huntington, CT (US)

(73) Assignee: OutlookSoft Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/257,858

(22) Filed: Oct. 25, 2005

(65) Prior Publication Data

US 2006/0036957 A1 Feb. 16, 2006

Related U.S. Application Data

(63) Continuation of application No. 10/855,913, filed on May 27, 2004, which is a continuation of application No. 09/580,676, filed on May 30, 2000, now Pat. No. 6,754,677.

(51) Int. Cl.
*G06F 17/00* (2006.01)

(52) U.S. Cl. ............... 715/212; 715/213; 715/215; 715/234; 709/217; 709/218; 709/219

(58) Field of Classification Search .......... 715/503–504, 715/513, 212, 213, 215, 234; 709/217–219
See application file for complete search history.

(56) References Cited

U.S. PATENT DOCUMENTS

| | | | |
|---|---|---|---|
| 5,008,853 A | 4/1991 | Bly et al. | |
| 5,220,657 A | 6/1993 | Bly et al. | |
| 5,319,777 A | 6/1994 | Perez | |
| 5,388,196 A | 2/1995 | Pajak et al. | |
| 5,404,488 A | 4/1995 | Kerrigan et al. | |
| 5,446,842 A | 8/1995 | Schaeffer et al. | |
| 5,537,526 A | 7/1996 | Anderson et al. | |
| 5,740,370 A | 4/1998 | Battersby et al. | |
| 6,006,239 A | 12/1999 | Bhansali et al. | |
| 6,021,470 A | 2/2000 | Frank et al. | |
| 6,029,175 A | 2/2000 | Chow et al. | |
| 6,138,130 A * | 10/2000 | Adler et al. ........... | 715/503 |

(Continued)

OTHER PUBLICATIONS

Patterson et al., "Computer Organization and Design", 1998, Morgan Kaufmann Publishers, 2nd Edition, pp. 540-550.

(Continued)

*Primary Examiner*—Stephen Hong
*Assistant Examiner*—David Faber
(74) *Attorney, Agent, or Firm*—Buckley, Maschoff & Talwalkar LLC

(57) ABSTRACT

A method and system for facilitating information exchange between individuals and entities interacting on a shared project are provided, and more particularly to a method and system for horizontal. i.e., non-hierarchical, participation in and/or contribution to a spreadsheet-based project. The method and system is Web-based and utilizes conventional browser and spreadsheet technology to achieve collaborative exchanges of information on an enterprise-wide basis. The method and system also facilitate efficacious remote information access and exchange, e.g., over a computer network such as the Internet and/or the World Wide Web, through a caching function that combines individual queries initiated by a spreadsheet program before transmitting across a network to a server for consideration.

15 Claims, 7 Drawing Sheets

U.S. PATENT DOCUMENTS

| | | | |
|---|---|---|---|
| 6,192,381 B1 | 2/2001 | Stiegemeier | |
| 6,192,408 B1* | 2/2001 | Vahalia et al. | 709/229 |
| 6,253,217 B1 | 6/2001 | Dourish et al. | |
| 6,332,150 B1 | 12/2001 | Khan et al. | |
| 6,360,236 B1 | 3/2002 | Khan et al. | |
| 6,470,349 B1 | 10/2002 | Heninger et al. | |
| 6,539,403 B2* | 3/2003 | Cho et al. | 707/203 |
| 6,550,056 B1* | 4/2003 | Mizumoto et al. | 717/124 |
| 6,604,046 B1* | 8/2003 | Van Watermulen et al. | 701/208 |
| 6,621,505 B1 | 9/2003 | Beauchamp et al. | |
| 6,694,309 B2* | 2/2004 | Cho et al. | 707/3 |
| 6,701,485 B1* | 3/2004 | Igra et al. | 715/503 |
| 6,724,403 B1 | 4/2004 | Santoro et al. | |
| 6,917,962 B1 | 7/2005 | Cannata et al. | |

OTHER PUBLICATIONS

Moseley et al., "Mastering Microsoft Office 97," 1997, Sybex, 2nd Edition, pp. 517-520.
Feigel C., "What a concept", Byte, vol. 8, No. 5, May 1983, pp. 134-150. USA, abstract.
McNish L., "Taking the personal computer to task," Dec User, Aug. 1983, pp. 27-29. U.K., abstract.
"Corvus Concept personal workstation," Small Business Computer News, vol. 9, No. 11, Nov. 1982, pp. 6-13. USA, abstract.
Nesbit IS, "Evaluating micro software," Datamation, vol. 30, No. 11, Jul. 15, 1984, pp. 74-78. USA, abstract.
Connell JJ, "Tracking new trends in office automation," Dun's Business Month, vol. 123, No. 6, Jun. 1984, pp. 118-122. USA, abstract.
Filstead CG III, "Portofolio management systems on a PC network," Computers in the City 1985. Proceedings of the International Conference. Online Publications. 1985, pp. 51-57 vol. 3. Pinner, UK, abstract.
Mortensen E., "Innovations in telecommunication networks and online information retrieval in the business environment," National Online Meeting. Proceedings—1987. Learned Inf. 1987, pp. 343-349. Medford, NJ, USA, abstract.
Horton PR, et al., "A shared network spreadsheet," Byte, vol. 12, No. 8, Jul. 1987, pp. 185-186, 188, USA, abstract.
Dollimore J. et al., "The design of a system for distributing shared objects," Computer Journal, vol. 34, No. 6, Dec. 1991, pp. 514-521, UK, abstract.
Gladney HM, "A storage subsystem for image and records management," IBM Systems Journal, vol. 32, No. 3, 1993, pp. 512-540, USA, abstract.
Firester J., "Product review: TM/1 spreadsheet connector," Accounting Technology, vol. 9, No. 8, Oct. 1993, pp. 58, 60. USA, abstract.
Leyland P., "Reading Notes," What's New in Computing, Mar. 1994, pp. 21-23, UK, abstract.
Banerjee NN., "PC-the software roundup," Telecommunications, vol. 43, No. 5, Oct. 1993, pp. 17-24, India, abstract.
Zhou HB et al., "Very fast distributed spreadsheet computing," Journal of Systems & Software, vol. 25, No. 2, May 1994, pp. 185-192., USA, abstract.
"Workflow vs. workgroup computing," Network Computing, vol. 3, No. 8, Sep. 1994, pp. 32-34, 36, 38, UK, abstract.
Fuerst C., "Implementation of a management-information-system (MIS) with integrated executive-information-system (EIS) at the Warsteiner Brewery," Proceedings. SHARE Europe Anniversary Meeting. Client/Server—the Promise and the Reality. .SHARE Europe. 1993, pp. 369-380..Carouge/Geneva, Switzerland, abstract.
Davis JC, et al., "Providing Internet connectivity for remote Alabama offices," Computers in Agriculture 1994. Proceedings of the 5th International Conference. American Soc. Agric. Eng. 1994, pp. 718-721. St. Joseph, MI, USA, abstract.
Kolva D. et al. "Considerations in selecting a laboratory information management system for the small laboratory," Chemometrics & Intelligent Laboratory Systems: Laboratory Information Management, vol. 26, No. 3, Dec. 1994, pp. 171-174. Netherlands, abstract.

Enzweiler AJ, "Improving the financial reporting process (network tools)," Management Accounting, vol. 76, No. 8, Feb. 1995, pp. 40-43, USA, abstract.
Robb J, "Lotus SmartSuite 97: now smart enough?" PC World, vol. 15, No. 3, Mar. 1997, pp. 164-168, 170, 172, 174, USA, abstract.
Feibus A., "A suite for the wired Lotus SmartSuite 97," Informationweek, No. 620, Mar. 3, 1997, pp. 51-53, 56. Publisher: CMP Publications, USA, abstract.
Curie D., The medium is the message: Data Downlink's .xls lets numbers stay numbers,: Online, vol. 21, No. 6, Nov.-Dec. 1997, pp. 64, 66. Publication: Online Inc., USA, abstract.
Robinson L., "Using Word 97 to create documents for an intranet," Managing Information, vol. 5, No. 4, May 1998, pp. 30-33. Publisher: Aslib, UK, abstract.
Diab H., "Simulation of cache-based parallel processing systems using spreadsheets," International Journal of Engineering Education, vol. 14, No. 2, 1998, pp. 136-144. Publisher: Tempus House of Publishers, Ireland, abstract.
J.J. Kistler et al., "Disconnected Operation in the Coda File System," ACM Transactions on Computer Systems, vol. 10, No. 1, Feb. 1992, pp. 3-25.
A. Gupta et al., "Maintenance of Materialized Views: Problems, Techniques, and Applications," Bulletin of the Technical Committee on Data Engineering, Jun. 1995, vol. 18, No. 2, IEEE.
M. Satyanarayanan, "Accessing information on demand at any location, Mobile Information Access," IEEE Personal Communications, Feb. 1996, pp. 26-33.
A.M. Keller et al., "A predicate-based caching scheme for client-server database architectures," The VLDB Journal (1996) 5: 35-47.
S. Dar et al., "Semantic Data Caching and Replacement," Proceedings of the 22nd VLDB Conference, Mumbai (Bombay), India 1996.
A.M. Keller et al., "Zippering: Managing Intermittent Connectivity in Diana," Baltzer Journals, Jan. 31, 1996.
J.L. Zhao et al., "Data Management Issues for Large Scale, Distributed Workflow Systems on the Internet," The Data Base for Advances in Information Systems, vol. 29, No. 4, Fall 1998.
United States District Court, Eastern District of Texas, Marshall Division: *Hyperion Solutions Corporation v. OutlookSoft Corporation*, Case No. 2-04CV-436-TJW, Plaintiff Hyperion Solutions Corporation's Final Invalidity Contentions Pursuant to Patent Rule 3-6(b), May 8, 2006, 212 pages.
Ferguson, K., Microsoft SQL Server 2000 Analysis Services Compared with Hyperion Essbase 6.0, 2001, Microsoft Corporation, (pp. 1-32 + cover, 33 total pages).
Pfeiff, B., "Navigating the Pivot Table Service," Apr. 1999, SQL Server Magazine pp. 1-2 (2 total pages).
Whitney, R., "OLAP Performance," Jan. 2000, SQL Server Magazine pp. 1-5 (5 total pages).
D'Hers, T. et al., "Comparing business Intelligence Platforms, Microsoft SQL Server 2000, Analysus Services vs. IBM DB2 OLAP Server 8.1 & Hyperion Essbase 6.5" 2003, Progressive Strategies, Inc., (pp. 1-31 + cover 2pgs. + table of contents 2 pgs. + table of figures 1pg., total 36 pages).
Microsoft SQL Server 7.0 Decision Support Services: Lowering the Cost of Business Intelligence, 1998, Microsoft Corporation (pp.1-19 + contents 2pg., total 25 pages).
Jonsson, B. T., "Applcation-Oriented Buffering and Caching Techniques," Dissertation - University of Maryland, College Park, 1998 (pp. 1-97 + abstract 2pgs. + cover 7 pgs. + table of contents 5pgs. + list of tables 2 pgs. + list of figures 3 pgs., total 216 pages).
"The Microsoft Data Warehousing Strategy," SQL Server General technical Articles, Microsoft Corporation, Jul. 11, 1998 (pp. 1-17).
SQL Server 7.0 Resource Guide, Chapter 13 - OLAP Services, http://www.mircosoft.com/technet/prodtechnol/sql/70/reskit/part9/sqc12.mspx, 2007. (pp. 1-12).
Bjeletich, S. et al., "Microsoft SQL Server 7.0 Unleashed," Sams Publishing, May 1999 (pp. 8-900 + cover 2 pg. + topcial reference 5 pgs. + contents 20pgs. + abouth the author 6pgs., total 932 pages).
Strum, J., "Data Warehousing with Microsoft SQL Server 7.0 technical Reference," Microsoft Press, Mar. 2000 (pp. 1-449 + pp. 151-261 + pp. 263-311 + pp. 313-446 + cover 4 pgs + contents 8pgs + tables 1pg + acknowledgements 1pg + introduction 4 pgs, total 472 pages).

Youness, S., "Professional Data Warehousing with SQL Server 7.0 and OLAP Services," Wrox Press Ltd., Jan. 2000 (pp. 1-604 + cover 4pgs. + table of contents 31 pgs., total 639 pages).

Microsoft SQL Server 7.0 System Administration Training, Microsoft Press, 1999 (pp. 1-29, 31-53, 55-73, 75-101, 103-171, 173-199, 201-219, 221-279, 281-389, 391-623 + cover 4pgs. + contents 13pgs. + about this book 19pgs. + ads 5 pgs., total 655 pages).

Nakamura, Y. et al., "Application of experimental personal computer network to spread sheet systems," Computer-Based Syst. Lab., Fijitsu Labs, Ltd., Kawasaki, Japan, abstract, 1999. (pp. 1-2).

S. Dar et al., "Semantic Data Caching and Replacement," Proceedings of the 22nd VLDB Conference, Mumbai (Bombay), India 1996. (pp. 1-12).

A.M. Keller et al., "Zippering: Managing Intermittent Connectivity in DIANA," Baltzer Journals, Jan. 31, 1996. (pp. 1-16).

A. P. Sistla et al., "Minimization of Communication Cost Through Caching in Mobile Environments," Proceedings of the ACM-SIGMOD, May 1994, Minneapolis, Minnesota. (pp. 1-2).

J. Basu, "Associative Caching in Client-Server Databases," A Dissertation Submitted to the Department of Computer Science and the Committee on Graduate Studies of Stanford University in Partial Fulfillment of the Requirements of the Degree of Doctor of Philosophy, Mar. 1998. (pp. 1-37, 30-49, 52-56,59-171 + cover 3 pgs. + abstract 2pgs. + acknowledgement 3 pgs. + contents 5 pgs. + list of tables 1 pg. + list og figurres 2 pgs., total 181 pages).

J.J. Kister, "Disconnected Operation in a Distributed File System," Submitted in partial fulfillment of the requirements for the degree of Doctor of Philosophy, School of Computer Science, Carnegie Mellon University, May 1993. (pp. 1-22, 24-77, 79-80, 82-147, 149-252 + cover 4pgs. + abstract 2pgs. + acknowledgement 2pgs. + contents 6pgs. + list of tables 2pgs., total 264 pages).

"Objectstore: Advanced C++ API User Guide, Release 5.1", Mar. 1998 (pp. 1-51, 54-181, 186-193, 196-289, 292-403, 406-416, 422-442 + cover 2pgs. + contents 22pgs., total 450 pages).

"Objetstore: Component Server Framework User Guide, Release 5.1", Mar. 1998. (pp. 1-4, 7-11, 14-36, 38-43, 48-50, 52, 55-61, 64-80, 82, 85-112, 114-116, 119-142, 144-176 + covers 2pgs. + contents 8pgs., total 165 pages).

Walkenbach, J., "Excel 97 Bible," Hungry Minds, Inc., 1996. (pp. 1-7, 9-51, 53-77, 79-127, 129-145, 147-237, 239-317, 319-341, 342-359, 361-445, 447-517, 519-565, 567-585, 587-659, 661-675, 677-689, 691-779, 781-794, 796-813, 815-849, 851-857, 859-865, 867-896 + cover 8pgs. + 27pgs. + ads 2pgs., total 911 pages).

Walkenbach, J., "Microsoft Excel 2000 Bible," Wiley Publishing Inc., May 7, 1999 (pp. 2-39, 42-69, 71-91, 93-137, 139-360, 362-427, 429-488, 490-509, 511-557, 559-593, 595-615, 617-662, 664-683, 685-697, 699-713, 715-727, 730-799, 801-821, 823-855, 857-869, 871-879, 881-895, 897903, 905-936 + cover 4pgs. + contents 2 pgs. + welcome to the Microsoft Excell 2000 Bible 2pgs. + quick start 40pgs. + contents 24pgs., total 989 pages).

Neklson, M. N. et al., "A Framework for caching in an Object-Oriented System," 1993, Sun Microsystems, Inc. (pp. 1-131).

* cited by examiner

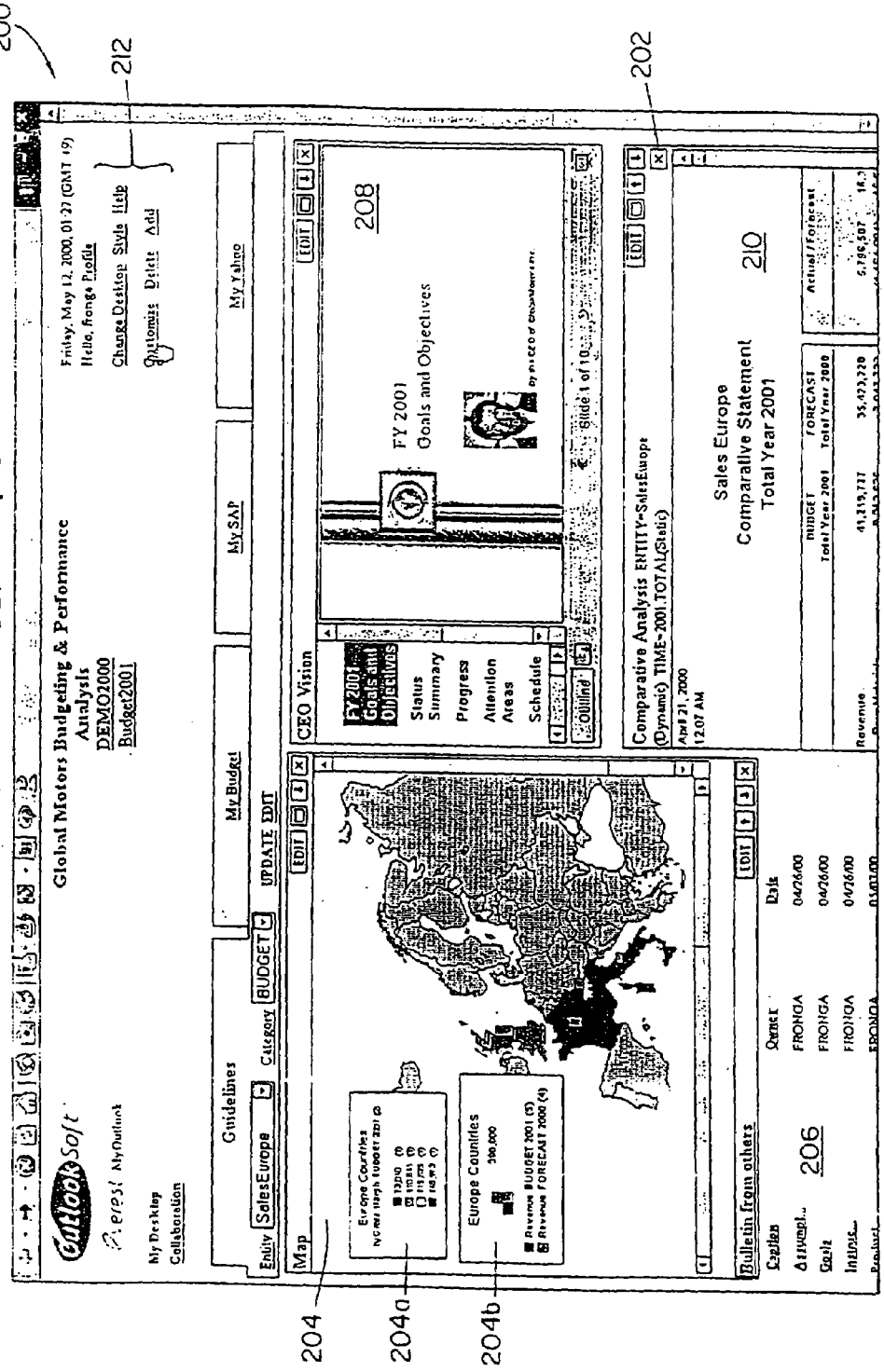

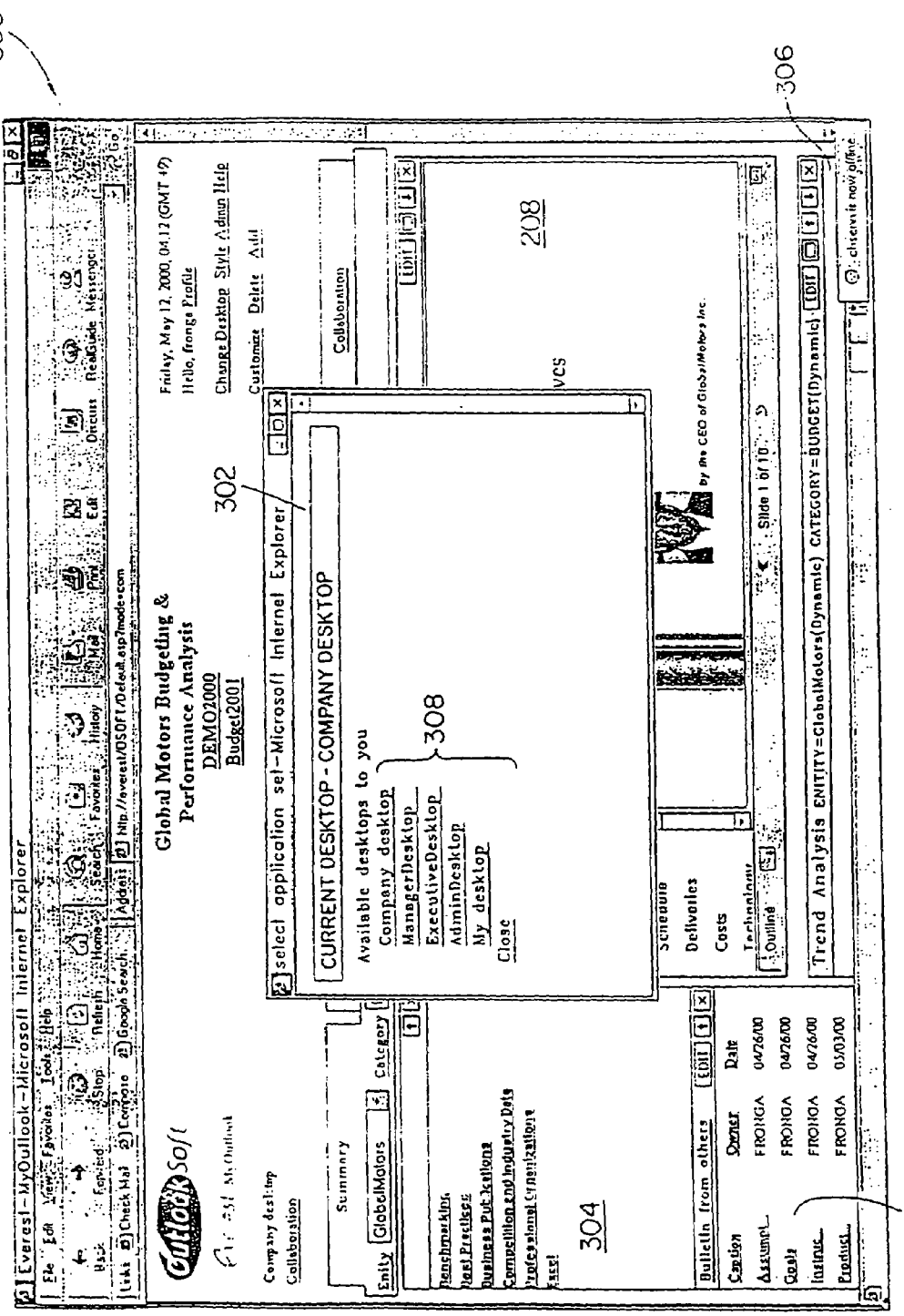
FIG. 3 SCREEN LAYOUT

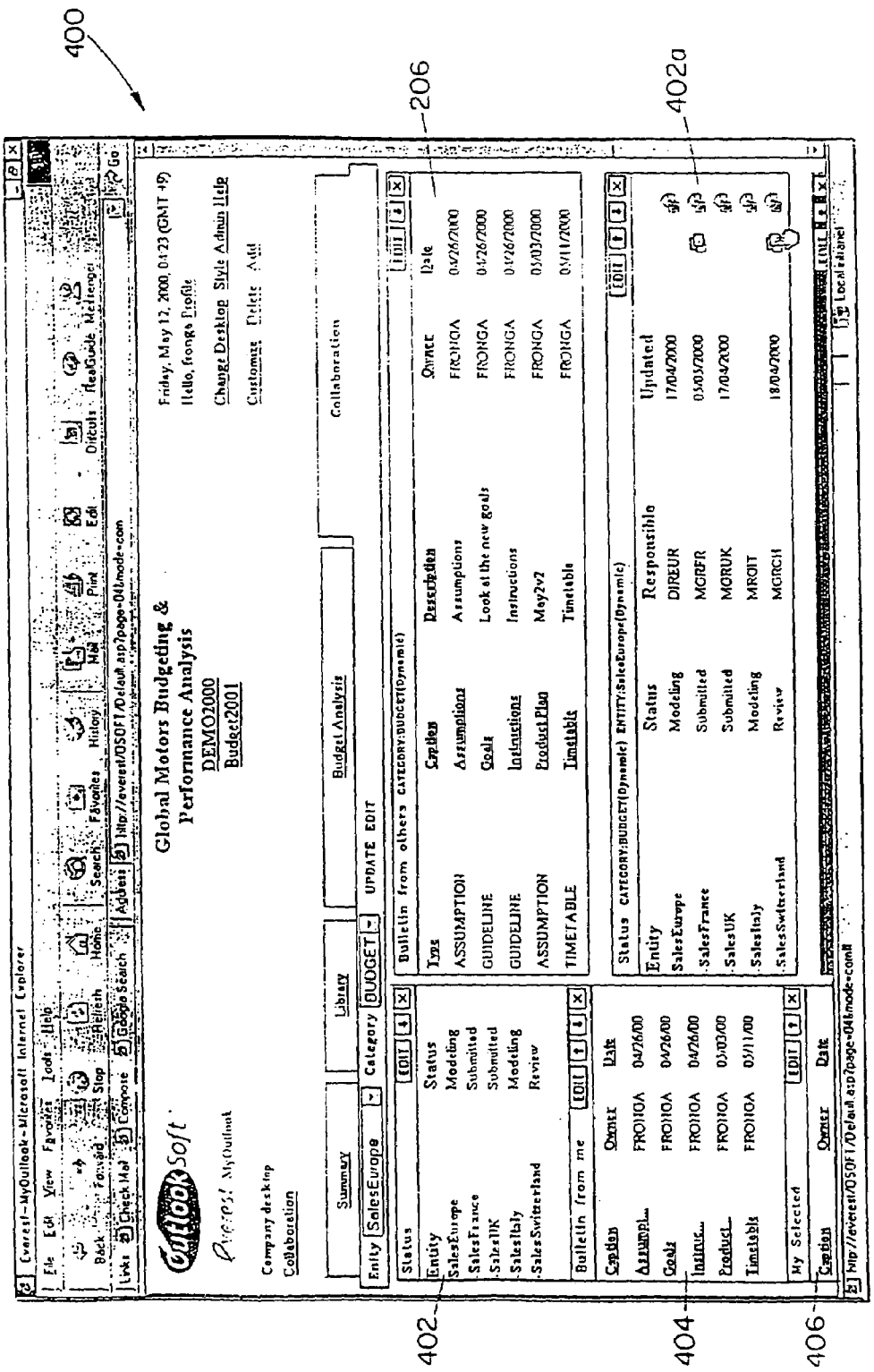
FIG. 4 SCREEN LAYOUT

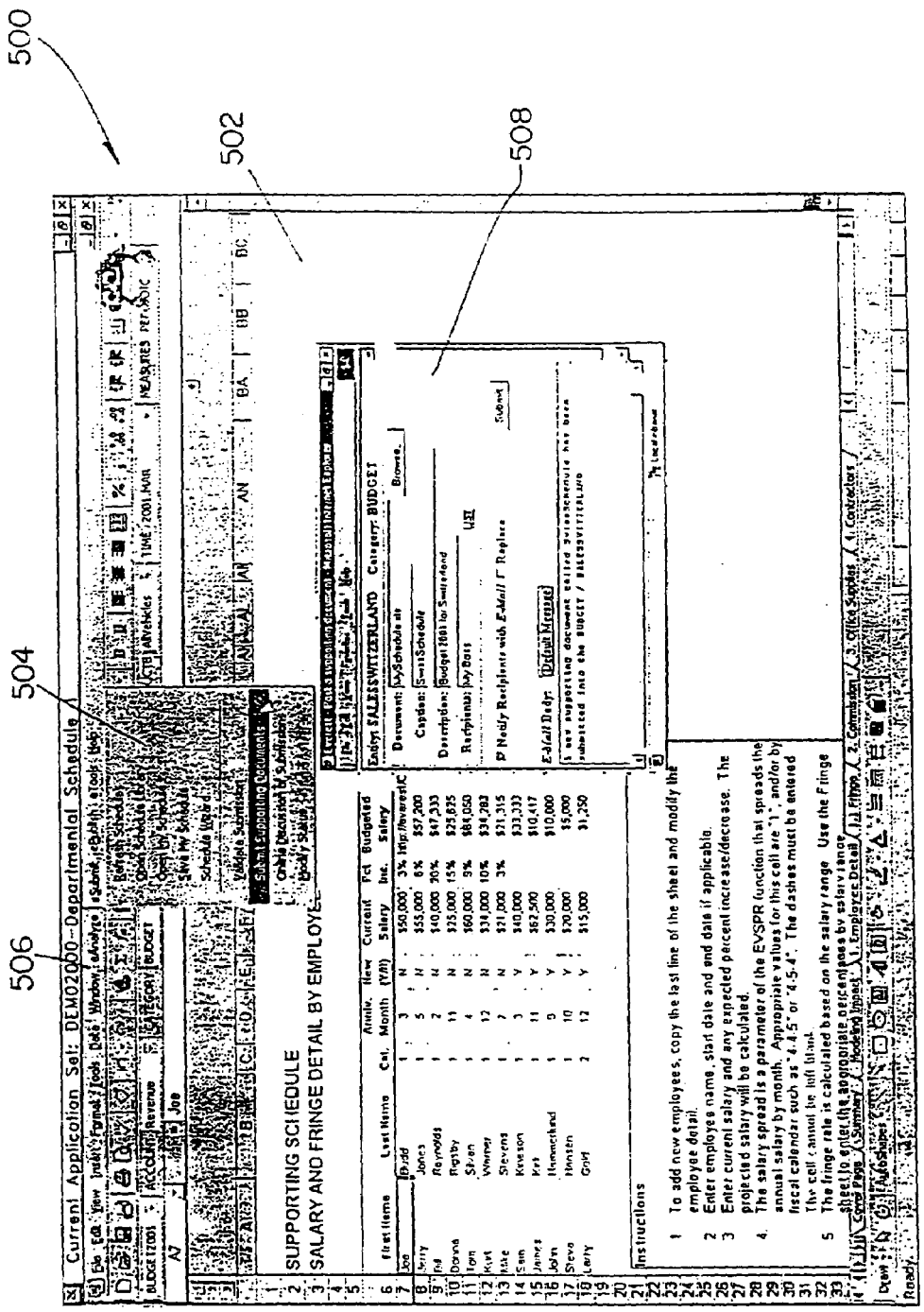
FIG. 5 SCREEN LAYOUT

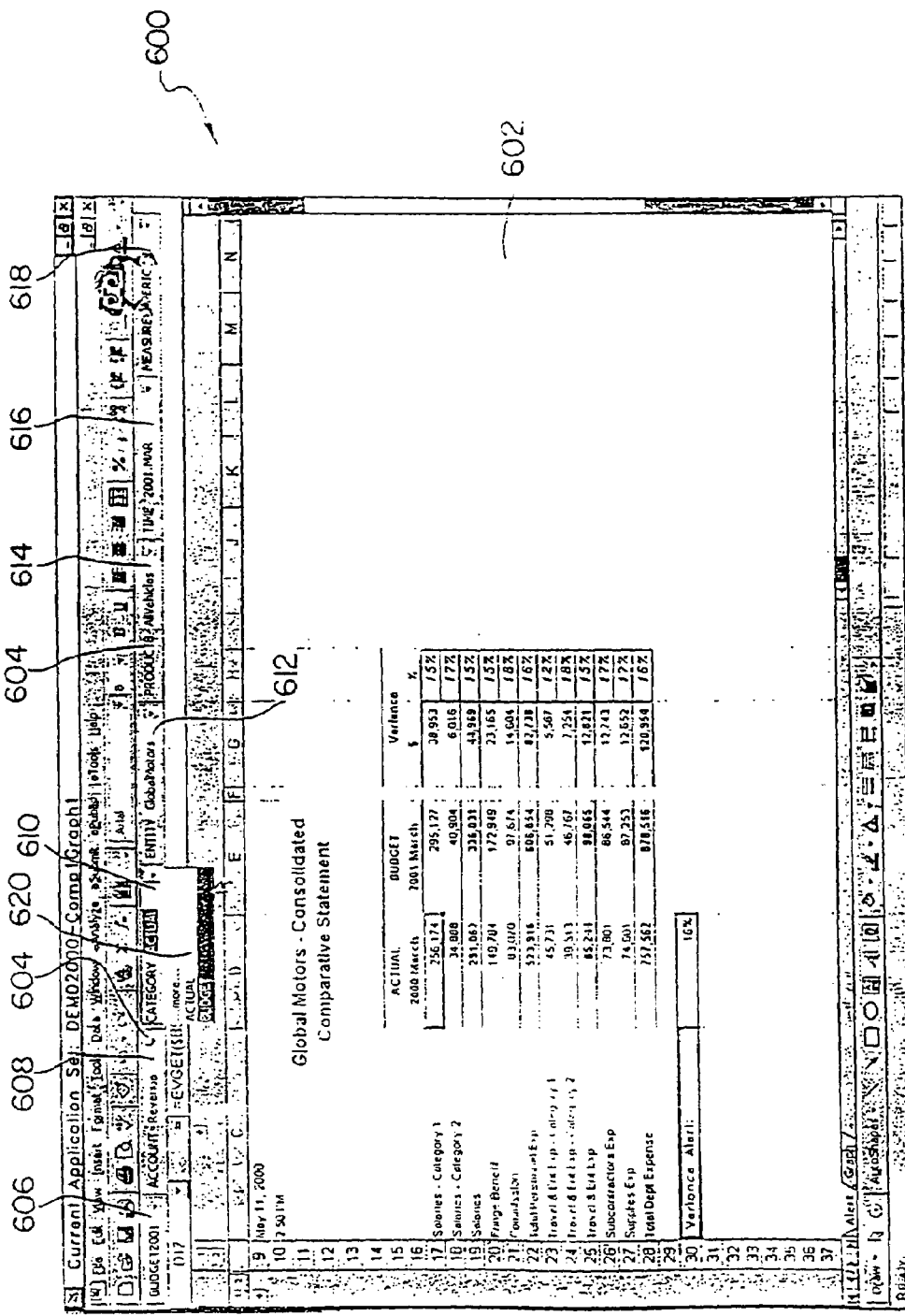
FIG. 6 SCREEN LAYOUT

FIG. 7 SCREEN LAYOUT

METHOD AND SYSTEM FOR FACILITATING INFORMATION EXCHANGE

CROSS REFERENCE TO RELATED APPLICATIONS

This application is a continuation of commonly assigned U.S. patent application Ser. No. 10/855,913, filed May 27, 2004, which is a continuation of U.S. patent application Ser. No. 09/580,676, filed May 30, 2000, now U.S. Pat. No. 6,754,677, all of which are hereby incorporated by reference herein in their entireties.

BACKGROUND

1. Technical Field

The present disclosure relates to a method and system for facilitating information exchange between individuals and entities interacting on a shared project, and more particularly to a method and system for horizontal, i.e., non-hierarchical, participation in and/or contribution to a spreadsheet-based project. In one embodiment of the present disclosure, the method and system facilitate efficacious remote information access and exchange, e.g., over a computer network such as the Internet and/or the World Wide Web.

2. Background of the Disclosure

The use of spreadsheets to collect, assess, monitor and manage information and data is pervasive. Over time, spreadsheet technology has evolved into a host of computer-based systems that facilitate flexibility and diverse applications, both for personal and business uses. Software products such as VisiCalc, Lotus 1-2-3, Quattro Pro and Excel have greatly expanded the availability and use of computer-based spreadsheet applications. Spreadsheet technology has also become part of innumerable "legacy" systems developed by companies to meet their specific needs and objectives, as those needs have evolved over time.

The computer-based systems and procedures for budgeting/forecasting corporate performance and for monitoring/evaluating actual performance relative to budget/forecast exemplify both the power and the limitations of current spreadsheet technology. A typical budgeting process is hugely time-consuming, cumbersome and inefficient, entailing countless iterations through reams of data. Typically, the budgeting process involves synthesis of historical information, competitive issues, long and short term corporate objectives, and forecasted revenues and expenses. Participants in a typical budgeting process are called upon to provide relevant information within their areas of responsibility and/or expertise. This information is fed into a spreadsheet program for ultimate consolidation into an overall budget.

Budgeting participants are often dependent on additional individuals within the organization to provide necessary information and input, e.g., information as to historical and projected performance, competitive pressures and the like. The involvement of these additional individuals is generally limited in that their participation in the budgeting process is controlled and/or filtered by the individual(s) within the corporate hierarchy to or through whom such individuals report. Moreover, current budgeting procedures are generally unable to effectively address and/or recognize the inter-related and inter-dependent nature of individually forecasted numbers. For example, if the sales organization forecasts a significantly greater percentage of sales in the far east, the various support functions that will be impacted by such increased sales, e.g., shipping and receiving, customer service, etc., may need to adjust their forecasts to reflect the shift in sales. However, current budgeting procedures generally do not facilitate the types of communications required to identify such variations and, once identified, to adjust the budget/forecast figures to accommodate such variations. Despite the significant expenditure of effort and expense, the budgeting process often lacks long-term value to management.

The implications of failures in the budgeting process are significant. First, individuals who are required to provide input to the budgeting process through a "superior" in the corporate hierarchy are often disenfranchised and frustrated by their limited involvement. Moreover, these individuals cannot be expected to take ownership of, or responsibility for, the final budget because their involvement was so attenuated and limited. Second, the hierarchical approach to budgeting generally infects the final budget with erroneous assumptions because the inter-related and inter-dependent nature of revenue/expense variables goes largely unrecognized and ignored. Third, the rationale behind various submissions to the budgeting process is often lost in the process. For example, if the R&D function is requesting an increase in headcount/expenditure because the sales/marketing function has identified a specific market need/opportunity that requires additional R&D effort, the underlying rationale for the R&D request, if known by "upper management," may compel an endorsement of the R&D request. Countless "rationales" support individual budget submissions, the majority of which are lost in the hierarchical budget process.

A further limitation of current budgeting processes is a general inability to integrate the budgeting process, and particularly the company's agreed upon budget, into management of the ongoing operation of the company. While certain members of the management team closely monitor company performance relative to budget, and such performance is periodically communicated to other segments of the corporate operation, particularly when performance is lagging budget forecasts, individuals outside of the "management circle" are largely unable to, and precluded from, measuring their performance against budget.

The failure to integrate the agreed upon budget into the day-to-day operations of a corporation has several negative implications. First, performance trends are not known to individuals having the ability to respond to such trends in a timely fashion. Second, ownership of and commitment to the budget by individuals outside of the "management circle" is further undermined. Third, a corporate culture based on performance against agreed upon objectives is significantly undermined. Fourth, the ability of non-management individuals to develop management skills is minimized. And fifth, an opportunity to learn from year-to-year budget issues, e.g., recognizing the interdependence of R&D expenditure to legal expenses for patent procurement, will go unfulfilled.

A further challenge to the effective management of any geographically dispersed organization is the timely exchange of, and access to, critical information. This challenge is particularly pronounced in the areas of budget preparation and the measurement/management of performance against budget. While a company generally collects, in real time, the data needed to formulate a budget and the performance data necessary to measure performance against budget, the availability of that data to individuals outside the management circle is generally restricted, if available at all. With the continued evolution of data communication, e.g., over the Internet and/or the World Wide Web, the infrastructure required to facilitate timely exchange and availability of data is generally available.

Several issues present themselves when companies evaluate the potential for allowing widespread access within the corporation to proprietary financial information, e.g., budgeting data, performance data, and the like. First and foremost is the need that the confidentiality of such critical information be maintained and that individuals having access to different levels of information be appropriately restricted. A further issue confronting such companies is the latency associated with transmission of such information to remote locations. For a system designed to facilitate remote access to corporate information to be successfully implemented and utilized, the system's response speed must be reliably optimized. Moreover, the system design must facilitate maximum flexibility in the analytical tools available to system users so that optimal assessments and decisions may be made in a timely fashion.

Despite efforts to date, particularly the widespread availability of spreadsheet-based systems and software programs (e.g., Lotus 1-2-3 and Excel), a need remains for a method and system for facilitating information exchange between individuals and entities interacting on a shared project. Indeed, a pronounced need exists for a method and system that facilitate horizontal, i.e., non-hierarchical. participation in and/or contribution to a shared project, e.g., a spreadsheet-based budgeting and/or performance measurement tool. Additionally, a need exists for a system and method that facilitate remote information access and exchange, e.g., over a computer network such as the Internet and/or the World Wide Web, with reduced latency.

SUMMARY OF THE DISCLOSURE

The present disclosure is directed to a new and useful method and system for facilitating information exchange between individuals and entities interacting on a shared project, and more particularly to a method and system for horizontal, i.e., non-hierarchical, participation in and/or contribution to a spreadsheet-based effort. In one embodiment of the present disclosure, the method and system facilitate efficacious remote information access and exchange, e.g., over a computer network such as the Internet and/or the World Wide Web, while reducing latency associated therewith.

BRIEF DESCRIPTION OF THE DRAWINGS

So that those having ordinary skill in the art to which the disclosed method and system appertains will more readily understand how to employ and use the same, reference may be made to the drawings wherein:

FIG. 2 is an exemplary screen display according to an embodiment of the present disclosure;

FIG. 3 is a second exemplary screen display according to an embodiment of the present disclosure;

FIG. 4 is a third exemplary screen display according to an embodiment of the present disclosure;

FIG. 5 is a fourth exemplary screen display according to an embodiment of the present disclosure;

FIG. 6 is a fifth exemplary screen display according to an embodiment of the present disclosure; and FIG. 7 is a sixth exemplary screen display according to an embodiment of the present disclosure.

DETAILED DESCRIPTION OF PREFERRED EMBODIMENT(S)

Figure 1:
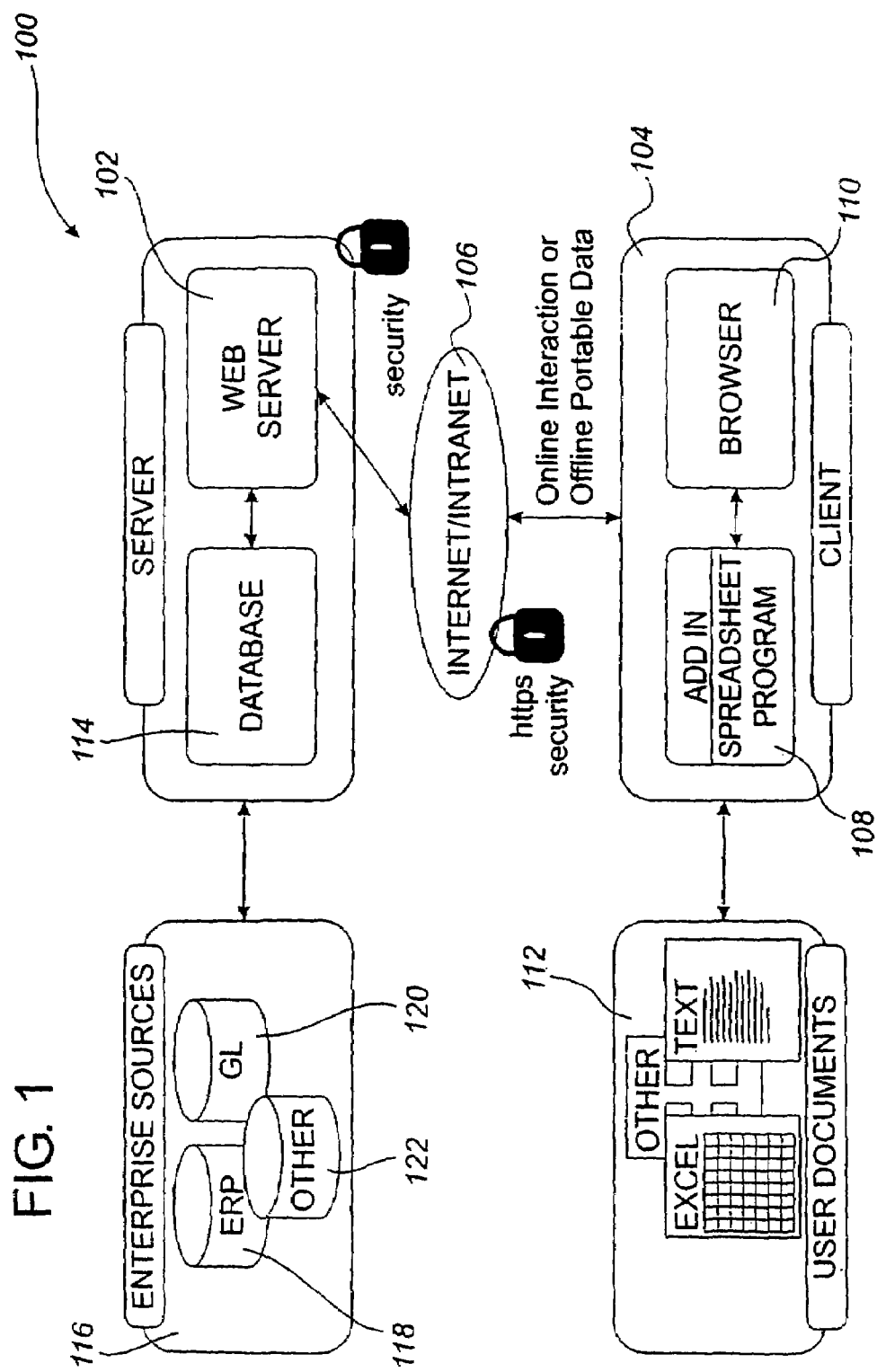
FIG. 1 is a schematic depiction of a network-based system according to the present disclosure.

The present disclosure provides a method and system for facilitating information exchange between individuals and entities interacting on a shared project. The method and system advantageously facilitates horizontal, i.e., non-hierarchical, participation in and/or contribution to the shared project. In a preferred embodiment of the present disclosure, the method and system facilitate input to and participation in the creation of a spreadsheet, e.g., in formulating an enterprise-wide budget and/or forecast. In a further embodiment of the present disclosure, the method and system facilitate efficacious remote information access and exchange, e.g., over a computer network such as the Internet and/or the World Wide Web, while reducing latency associated therewith.

The method and system of the present disclosure provide, inter alia, a Web-based financial analytic solutions and professional services utility that can be effectively utilized by companies of any size, across any and all industries and geographic locations. The method and system optimally utilizes and combines the benefits of a centralized data and document repository with the flexibility of distributed spreadsheet technology that effectively leverages the infrastructure of the Internet. Moreover, the method/system disclosed herein allows users to dynamically link budget spreadsheets to centrally administered OLAP and relational databases.

According to the present disclosure, a Web-centric "meeting place" for all levels and functional areas of an enterprise may be advantageously created to facilitate: (i) communication concerning corporate strategy; (ii) assessment of critical assumptions necessary for effective budgets/forecasts; (iii) creation and collaboration in budget creation; (iv) tracking and managing of the budgeting process; and/or (v) viewing of personalized performance metrics. Through utilization of the method/system of the present disclosure, companies are better able to align budgets with corporate strategies and deliver accurate budgets faster and with less effort. The present method/system require minimal user training, minimal maintenance and/or support resources from internal IT personnel, and optimally utilizes and is based upon accepted technology standards.

Turning to FIG. 1, a schematic depiction of an exemplary system 100 according to the present disclosure is provided. System 100 includes a server 102 and an exemplary client 104 that communicate across a computer network 106, e.g., an intranet, the Internet and/or the World Wide Web. As will be readily apparent to persons skilled in the art, client 104 is intended to be representative of a plurality of clients 104, each of which may communicate with server 102 via network 106, whether sequentially or simultaneously, provided appropriate security clearance is achieved.

With reference to network 106, it is contemplated according to the present disclosure that clients 104 may access and communicate with network through any data communication technology. For example, client 104 may comprise one or more personal computers that are part of a conventional local area network (LAN) that is wired directly to the Internet through a conventional port, e.g., a T-connection. Client 104 may also constitute one or more personal computers that use a modem to connect via a phone or cable connection to a network. The personal computers may also be part of a peer-to-peer network. In any case, client(s) 104 are adapted to communicate with network 106 such that information may be transmitted to and from server 102, e.g., through one or more routers, wide area networks (WANs), satellites, hubs, repeaters, bridges and gateways, as is known in the art. Data transmissions are typically passed from network to network in packets that include not only the substantive aspects of the data transmission, but addresses, error checking information and the like.

With further reference to FIG. 1, client 104 includes at least two software applications for purposes of the method and system of the present disclosure: a spreadsheet software program 108 and a Web browser software application 110. Spreadsheet program 108 and browser 110 are loaded into the memory of client 104 or otherwise available for utilization by client 104, e.g., from an ancillary floppy, CD-ROM, DVD and/or tape drive. Any conventional browser 110 is contemplated for use according to the method/system of the present disclosure, e.g., Netscape Communicator or Microsoft Internet Explorer. Similarly, the method/system of the present disclosure may be utilized with any spreadsheet program 108, e.g., Lotus 1-2-3, Quattro Pro, Excel and/or legacy spreadsheet systems. A preferred spreadsheet program 108 for use by client 104 according to the present disclosure is Microsoft Excel 2000. Indeed, the method/system of the present disclosure advantageously utilizes the full functionality of Microsoft Excel 2000, e.g., report wizards, spreadsheet design, spreadsheet modification, etc., as is known to persons skilled in the operation and use thereof. Preferred browser programs 110 for use by client 104 according to the present disclosure are Microsoft Internet Explorer 4.0 (or later) and Netscape Communicator V4.0 (or later). As with Microsoft Excel 2000, the method/system of the present disclosure advantageously utilizes the full functionality of such browser programs, as are known to persons skilled in the operation and use thereof.

Beyond spreadsheet program 108 and browser 110, client 104 typically contains and/or has direct access to a variety of ancillary user documents 112, whether stored within its memory and/or accessible from an associated drive or server. For example, client 104 may have access to user documents 112 that include word processing documents, audio and/or graphical files, spreadsheets and the like. Client 104 is adapted to work "off-line," i.e., independent of network 106, or "on-line," i.e., in communicative interaction with network 106 and server 102. When working off-line, client 104 will not have access to data stored in database 114 associated with server 102, nor will client 104 be able to feed data to database 114. Nonetheless, data from database 114 may be pre-downloaded to client 104 when on-line and, to the extent data is input, modeled and/or modified at client 104 by a user working off-line, such input/modified data may be stored in the memory of client 104 and subsequently transmitted/uploaded to server 102 via network 106 thereafter. In a preferred embodiment of the present disclosure, client 104 includes an operating system selected from Microsoft Windows or Microsoft NT Workstation.

With further reference to FIG. 1, server 102 facilitates client 104 communication and data exchange with database(s) 114. Server 102 preferably facilitates access to enterprise systems and/or sources 116, e.g., an enterprise's ERP system 118, general ledger 120 and other systems 122. System 100 preferably provides dedicated high-speed connections to multiple, scalable backend databases 114 and file servers 102. In a preferred embodiment of system 100, server 102 utilizes the Windows NT 4.0 operating system and, based on the approximate number of users, is configured as follows:

| Number of Users | Number of Servers | Exemplary Components |
|---|---|---|
| Up to 50 | 1 server | Web/File/SQL/OLAP |
| 50 to 250 | 2 servers | Web/File SQL/OLAP |
| 250 to 500 | 3 servers | Web or Web File File/SQL SQL/OLAP OLAP |

-continued

| Number of Users | Number of Servers | Exemplary Components |
|---|---|---|
| 500 to 1000 | 4 servers | Web 1 or Web Web 2 File File SQL SQL/OLAP OLAP |
| 1000 and beyond | 5+ servers | 2 or more Web File SQL OLAP |

To maximize speed and performance characteristics, server(s) 102 are generally uniformly configured, while permitting customization that best meets individual user's system requirements. Typical server 102 configurations according to the present disclosure are set forth below:

| Component | Low End | High End |
|---|---|---|
| Pentium III/500 CPU | Dual | Quad |
| RAM | 256 MB | 2 GB |
| Hard Drive(s) | 9 GB Raid 5 | 20 GB Raid 5 |

In preferred embodiments of the present disclosure, system 100 provides security across all physical and logical components, thereby ensuring high level data and application integrity. Functional security is generally provided by allowing system administrator(s) to restrict user access to features, functionality, documents and data, down to individual dimensions or fields within the spreadsheet program 108. In addition, connections security is generally achieved according to the present disclosure by providing data encryption of all information exchanged via the Internet and/or World Wide Web by utilizing SSL connections through https protocol and encryption keys.

Turning to FIG. 2, an exemplary screen layout 200 is provided from which certain aspects of the method/system of the present disclosure may be described. Screen 200 is representative of screen layouts that may be viewed by users of clients 104. The application software required to provide the functionality described herein may be readily downloaded and/or installed at client 102, e.g., by an Internet download as is known in the art. Installation of such application software may advantageously provide an icon on the desktop of client 102, facilitating user access thereto. Sign-on to system 100 typically includes appropriate name/password entry to validate user access.

With further reference to FIG. 2, the content on screen 200 is contained in a plurality of cells or blocks 202. In particular, on exemplary screen 200, cells 202 include "map" 204, "bulletin from others" or "bulletin board" 206, "CEO vision" 208, and "comparative analysis" spreadsheet 210. Each individual cell 202 is preferably provided with conventional functionality keys that permit the cell view to be enlarged, edited, scrolled and/or closed. Reorganization and/or modifications to the layout and styling associated with information displayed on screen 200 may be facilitated through conventional menu-driven commands 212, subject to inherent controls and/or limitations that may be built into the screen display functionality. For example, system 100 may be programmed such that the positioning of the CEO vision 208 may not be modified, thereby ensuring ready viewing of information considered to be critical to the enterprise. Preferably, system 100 allows as many as thirty blocks 202 to be viewable on each page or screen view, thereby allowing a user to scroll from block to block for efficient access to relevant information. As with conventional applications, individual blocks 202 may be enlarged to fill a user's screen through appropriate keyboard/mouse commands, e.g., double clicking on the desired block 202.

As demonstrated by screen 200, system 100 advantageously facilitates group participation in an enterprise-wide project, e.g., budgeting and/or forecasting, through the expeditious sharing of relevant data and information in real time. Thus, CEO vision 208 illustrates the types of information that can be conveyed to participants in the budgeting process, e.g., corporate objectives, budgeting parameters, strategic opportunities and the like. Information conveyed in CEO vision 208 may be periodically updated and/or revised, and may be replaced and/or supplemented by other management information, e.g., message(s) from the CFO, controller and/or other financial personnel concerning the status and/or parameters for completion of the budgeting process.

Based on the functionality of browser 110, the informational content within each of cells 202 may advantageously link to ancillary sources of information, e.g., documents contained within an enterprise source 116, e.g., supporting spreadsheets, word processing documents, PowerPoint presentations, video files, sound files and the like, or to external sources of information located on the Internet and/or World Wide Web, e.g., news stories, analyst reports, competitor publications, and the like. The ability to connect ancillary sources of information with communications associated with the budgeting process afforded by the method/system of the present disclosure significantly improves the efficiency, reliability and accuracy of the budgeting process. Moreover, through use of conventional hyperlinking technology, the direct association of such ancillary information with a specific aspect of a budget-related submission is technically efficient and will not encumber or otherwise slow the budget process. Indeed, recipients of such budget-related submissions will be readily able to access supporting documentation and assess the merits of a submission expeditiously and with full knowledge of relevant background information.

Referring again to FIG. 2, European map 204 is illustrative of the types of information that might be depicted on screen 200 that would be of particular relevance to an individual participating in the budgeting process, e.g., an individual responsible for European sales. European map 204 could be stored on client 104, within database 114, within an enterprise source 116 and/or on the Internet/World Wide Web. Data blocks 204a, 204b include detailed information concerning the underlying subject matter of map 204 and may be linked thereto from map 204 and/or formatted into the display of map 204. The data content of data blocks 204a, 204b may be derived from any of the potential data sources detailed hereinabove.

As noted above, screen 200 is merely illustrative of the screen views provided by the method/system of the present disclosure. For a user having different functional responsibilities within the company, e.g., the vice president of research and development or the general counsel, map 204 would advantageously be replaced by content of relevance to those users, e.g., organization charts, program reports, statistics concerning new product introductions, etc. In addition, a user having interest in European sales, whose personal page is depicted in FIG. 2 according to the method/system of the present disclosure, has the ability to periodically change the content of cell 202 from map 204 to modified content of interest, e.g., using the edit function depicted in screen 200.

With reference to bulletin board 206, the method/system of the present disclosure advantageously provide a direct communication function that, in certain respects, resembles an email system, but for the purposes of the present disclosure, far surpasses email in effectiveness and communicative efficiency. Bulletin board 206 facilitates information sharing by providing a centralized location for posting and/or storing information relevant to a task, e.g., budgeting. For example, users may desire to post information concerning budget guidelines, timeliness, templates and the like on bulletin board 206. Rather than email this information to everyone, thereby assuming the inherent risk that someone will be inadvertently omitted from the email distribution list, the information can be easily posted to bulletin board 206 according to the present disclosure, where anyone having a need and/or interest in the posted information will have ready access thereto. In a preferred embodiment of the present disclosure, a user posting information to bulletin board 206 has the option of emailing recipients and/or other interested parties with notification that the posting has occurred, thereby increasing the likelihood of immediate review of the posted information.

In a further preferred embodiment of the present disclosure, postings to bulletin board 206 may be categorized by category and/or document type. For example, in processing a bulletin board posting, a user may be required to designate the type of document being posted from among a predetermined list of categories, e.g., assumption, guideline, schedule, timetable and package. With reference to the above-noted categories, "assumptions" may typically originate from executive personnel and may be used to communicate the company's vision for the future to members of the organization, e.g., corporation is looking for twenty percent top-line growth or corporation is looking to increase gross margins by three percent. "Guidelines," like assumptions, may typically originate from senior members of the corporation and may place caps or floors on aspects of the budgeting process, e.g., T&E expenses to increase by no more than three percent or distributor sales to increase by at least five percent year-over-year. "Schedules" may include templates for inputting data, e.g., an input schedule, and "timetables" may include timelines for submitting data and/or dates for key meetings/corporate events. "Packages" may include budget-related informational packages, e.g., background information required by individuals within the organization to fulfill their responsibilities in the budgeting process. Additional categories may be added by a system administrator, as needed by individual corporations from time-to-time.

The system/method of the present disclosure generally provides an address book or "listing" for use in posting messages on bulletin board 206. Message transmission may be directed to one or more targeted recipients, thereby facilitating non-hierarchical dialog concerning the budgeting process. In addition, predetermined groups may be provided and/or established to facilitate communications to individuals having a shared interest in types of postings. Messages posted to a collaborator's bulletin board 206 may advantageously provide narrative information and/or inquiries and may enclose, attach and/or link to documents contained within system 100, e.g., in database 114 or enterprise source 116. Messages are instantaneously posted to the recipient's bulletin board 206, independent of any email system, and facilitate direct non-hierarchical communication and collaboration in the budgeting process. Viewing of posted message(s) by the recipient can be confirmed by the individual making the transmission, thereby ensuring that the recipient has received the desired communication. Recipients are able to forward the message to additional recipients, but are unable to change the underlying content thereof. Postings may be sorted based on a multiplicity of attributes. e.g., data, transmitter, topic and the like, and may be edited and/or deleted by the user who posts the message.

With further reference to FIG. 2, comparative analysis spreadsheet 210 is representative of a host of spreadsheets and spreadsheet-based documents that may be accessed, modeled and submitted as part of the collaborative budgeting process according to the method/system of the present disclosure. Exemplary comparative analysis spreadsheet 210 is typically run on and rendered by a conventional spreadsheet program 108, e.g., Excel, and typically derives its information, formulas and/or data from database 114 and/or other resources 116. Alternatively, when working off-line, comparative analysis may derive its information, formulas and/or data from the hard drive of the user's personal computer and/or ancillary drives associated with such personal computer. A user may view, modify, update, model, test assumptions, and the like by inputting data and/or formulas to comparative analysis spreadsheet 210, or such other spreadsheets as may be displayed on screen 200 according to the present disclosure.

When a user enters a formula into a cell or dimension of spreadsheet 210, the spreadsheet program 108 typically processes the formula through a minicompiler that reformats the function names, as is known in the art. The result of the compilation is typically written to a memory location reserved for that cell or dimension. Pointers to other formulas in the spreadsheet are provided by the spreadsheet program 108, effectively creating a list of cells that contain formulas, thereby saving the spreadsheet program 108 time and providing improved efficiency during recalculations. Deletion of a formula by the user results in redirection of its pointer so as to reconnect the formula chain. When the spreadsheet is recalculated, spreadsheet program 108 saves time by making a first pass through the pointer list to identify cells or dimensions that contain formulas. The spreadsheet program typically finds those formulas that depend on data that has changed and marks each one that needs to be recalculated.

Having identified the cells requiring recalculation, spreadsheet program 108 typically makes a second pass through the list focusing only on formulas marked for recalculation. For each, spreadsheet program 108 typically determines if the formula depends on another formula that has yet to be recalculated. If so, spreadsheet program 108 adjusts the cell's pointers and the pointers of connected cells/dimensions so that the dependent formula(s) move to the end of the list. When formulas are encountered that are not dependent on yet-to-be calculated formulas, spreadsheet program 108 typically undertakes to make the calculation required by such formulas. Critical to the calculations described herein is the efficiency of the required data retrieval associated therewith.

In the method/system of the present disclosure, spreadsheet program 108 is advantageously utilized by users that are dispersed geographically. As such, data is optimally maintained in central database repositories, e.g., database 114 and enterprise sources 116. Each time a query and/or response is transmitted between a user's client 104 and server 102, e.g., data retrieval from or input to database 114, latency issues associated with network 106 are encountered. According to the present disclosure, a unique caching method/system are provided that optimize the efficiencies associated with data exchange between client 104 and server 102. The caching method/system disclosed herein is flexible in design and operable with any spreadsheet program 108 and/or hardware/software infrastructure.

In conventional spreadsheet programs, data retrieval is generally achieved according to one of the following modalities: (i) cell-based responses to multi-parameter queries yield cell blocks of data that are not delivered directly to cells within spreadsheet; (ii) cell-based responses to individual queries are delivered directly to the spreadsheet cell requiring such data, but each cell-based data query automatically results in an independent and immediate inquiry to the database for the required data; and (iii) a pivot table. In distinct contrast to conventional data retrieval modalities, the method/system of the present disclosure utilizes a caching system on client 104 that greatly facilitates data retrieval and reduces potential delays associated with the latency of network 106.

According to the caching system of the present disclosure, client 104 includes a first caching function, termed a "data cache," that automatically caches data that is input at client 104 or retrieved to client 104, e.g., from database 114 or enterprise source 116. Thus, with reference to spreadsheet 210 in FIG. 2, when the revenue figure for "Budget—Total Year 2001" is first retrieved from database 116 by client 104 (i.e., $41,219,727), such figure is automatically stored in the data cache. Thereafter, each time a recalculation of spreadsheet 210 is required, the data cache will be accessed to obtain the previously cached revenue data required by the cell entitled Budget—Total Year 2001. Thus, according to the caching method/system of the present disclosure, data contained in the data cache of client 104 need not be retrieved across network 106 from server 102.

A second caching function possessed by client 104 according to the present disclosure enables client 104 to greatly minimize the numbers of inquiries made and response received across network 106. According to this second aspect of the caching system, client 104 possesses a "key cache" functionality that automatically checks internally for each piece of data requested by spreadsheet program 108 and, to the extent such data is within the data cache of client 104, the key cache provides such data immediately to spreadsheet program 108 for use therein. Additionally, the key cache eliminates such data requirement from any potential requests to be made across network 106, i.e., data contained in the data cache is automatically omitted from queries across network 106. Conversely, pieces of data that are requested by spreadsheet program 108 and are determined by the key cache not to be in the data cache, are retained by the key cache for combination with all other such data requests before any transmission is made across network 106.

In use, the advantageous caching function of the present disclosure operates as follows. When the spreadsheet program 108 is called upon by the user of client 104 to render a spreadsheet, e.g., spreadsheet 210 in FIG. 2, or to re-render a spreadsheet to reflect revised data, formatting and/or formulas, the spreadsheet program 108 calls upon the client to provide the data necessary, formatting and/or formulas necessary to respond to the user's request. The key cache determines whether all requested data, formatting and/or formulas are contained within the data cache of client 104. To the extent the required data, formatting and/or formulas are contained within the data cache, such requested information is immediately provided to spreadsheet program 108 for use therein. However, to the extent the data cache does not contain requested data, formatting and/or formulas, the key cache accumulates such unfulfilled requests for combination into a single inquiry to be transmitted across network 106 to server 102. The cached queries are generally built into a small object for transmission across network 106. In a preferred embodiment of the caching function described herein, the spreadsheet program 108 is instructed not to re-render the spreadsheet until all required data is retrieved from server 102, thereby minimizing potential user confusion associated with partial renderings of spreadsheets at client 104.

When the spreadsheet program 108 has completed its requests for data, formatting and/or formulas, the key cache packages up the requests that could not be fulfilled by the data cache into a single data object and transmits those inquiries in a single query to server 102 across network 104. Upon receipt of the single inquiry, server 102 routes the query to the appropriate repository for response thereto, e.g., database 114 or enterprise source 116. Server 102 advantageously collects the individual pieces of information necessary to respond to the packaged query provided by the key cache, and packages those pieces of information for a single responsive transmission across network 106 to client 104.

Upon receipt of the responsive transmission from server 102 at client 104, the key cache automatically stores the responsive pieces of data, i.e., data, formatting and/or formulas, in the data cache for future reference. In a preferred embodiment of the present disclosure, the key cache prompts spreadsheet program 108 to initiate a recalculation upon receipt of the needed data from server 102. In attempting to recalculate, spreadsheet program 108 queries the cache within client 104 for all needed information/data, i.e., the data, formatting and/or formulas that were not previously contained in the data cache. In response to this prompted query from spreadsheet program 108, the key cache looks to the data cache for the needed information and transmits such information to the spreadsheet program 108 for use therein. Spreadsheet program 108 feeds the data to its calculation engine to sequentially generate the calculated values for the cells requiring such calculated values, and renders the final spreadsheet for viewing by the user at client 102.

Preferably, the caching function within client 104 of the method/system disclosed herein advantageously optimizes the transmissions across network 106 associated with user input of data, formatting and/or formulas at client 104 as well. Thus, the key cache preferably accumulates input by the user for a single transmission to server 102 across network. Moreover, the system/method of the present disclosure advantageously limits the amount of data retrieved from server 102 by defining fields otherwise left undefined in the query from spreadsheet program 108 by utilizing the fields of the "current view" (as described in greater detail hereinbelow) to fill in the missing or omitted fields/dimensions of the request. For example, if the request to build a cell within spreadsheet program 108 is for "sales revenue," the method/system of the present disclosure preferably automatically determines from the current view of the user at client 104 that the sales revenue of interest relates to "European sales." Absent the limitative "current view" modality, the key cache would be required to request retrieval of all "sales revenue" data from server 102, rather than the limited "European sales revenue" of interest for spreadsheet 210 that constitutes the "current view" for purposes of FIG. 2.

The caching function of the present disclosure thus serves to optimize interaction across network 106 in several key respects, thereby minimizing latency issues and increasing the speed and efficiency of spreadsheet program 108. While the caching function is described herein primarily with reference to the spreadsheet functionality of system 100, and more particularly with reference to the budgeting/forecasting/performance metrics of a preferred embodiment thereof, it is specifically contemplated that the caching functionality described herein may be beneficially employed in a wide range of networked applications and utilities, as will be apparent to persons skilled in the art based on the disclosure herein.

The system/method of the present disclosure advantageously overcomes the hierarchical limitations that have heretofore hampered the efforts of enterprises to budget and/or forecast performance and to subsequently measure performance metrics thereagainst, by enabling and empowering individuals to communicate in a non-hierarchical, e.g., lateral, manner. With reference to FIG. 3, exemplary screen layout 300 is depicted with a menu screen 302 positioned thereon. As noted previously, screen layout 200 depicted in FIG. 2 is illustrative of the types of screen views available according to the present disclosure and, based on the contents thereof, is representative of the type of screen view that an individual having direct or indirect involvement in European sales might avail himself/herself of. Screen view 300, by contrast, is more generic than screen view 200, and includes a library 304 of enterprise-related information, bulletin board 206, CEO vision 208, a spreadsheet 306 related to "Trend Analysis." Spreadsheet 306 is representative of a utility provided according to the present disclosure to measure, monitor and communicate the performance metrics of an enterprise to globally dispersed corporate personnel in real time. With reference to the caching functionality discussed hereinabove, the budget-related aspects of spreadsheet 306 are likely to remain unchanged, will be cached within the data cache the first time they are retrieved from server 102, and will be provided from the data cache for re-rendering of spreadsheet 306 without the need to repeatedly access the data from server 102 across network 106.

With further reference to menu screen 302, links to a plurality of desktop views 308 are provided, namely the "company desktop," the "manager desktop," the "executive desktop," the "admin desktop," and "my desktop." Screen view 300 corresponds to an illustrative "company desktop." The links to alternative desktop views 308 depicted in menu screen 302, illustrate one aspect of the present disclosure that facilitates non-hierarchical collaboration in budgeting, forecasting and/or measurement of performance metrics. Each desktop view 308 represents a subgroup within an exemplary enterprise that may benefit from timely exchange of information. The groupings reflect different ways of looking at the interplay between an enterprise's workforce. For example, individuals at a manager level have issues that concern each of them, regardless of the functional group in which they work. e.g., accounting, engineering, quality control, human resources, etc. These managers are generally isolated from one another in developing budget/forecast information and in measuring their respective performance metrics. According to the method/system of the present disclosure, this isolation is overcome in favor of highly effective, timely and reliable access to each other and to the data necessary to perform their respective functions more effectively. Similarly, the subgroups defined by the executive desktop and admin desktop views 308 address issues of common interest and concern.

The blocks or cells 202 on each desktop view 308 will differ, as will the types and degrees of financial information/spreadsheets available to users having access to those desktop views. Each desktop is easily accessed by browser 110 at client 102. To the extent the data required to assemble a linked desktop view is contained in database 114 and/or enterprise resource 116 at server 102, client 102 will access such data via network 106, as discussed hereinabove. An administrator for the system of the present disclosure can easily create, amend and/or delete groups/subgroups in response to the enterprise's needs over time. Groups and/or subgroups may be established that constitute relatively arbitrary, yet relevant, employee subsets who benefit themselves and the enterprise in their collaborative interaction. Utilization of subgroups, e.g., the "admin desktop," facilitates and fosters senses of empowerment, commitment and ownership for corporate personnel who participate in the budgeting process and/or who have access to performance metrics in a timely fashion.

Turning to FIG. 4, a further exemplary screen view 400 is provided in which bulletin board 206 has been carried forward from screen view 200, although in a different position and in an expanded format. The expanded format of FIG. 4 includes information concerning the "caption" and the "description" of each posted message, as selected by the individual posting the message. In addition, screen 400 depicts illustrative status boards 402, 402a, bulletin board 404 and a "My Selected" bulletin board 406. Bulletin boards 404, 406 illustrate a user's ability to view information in multiple formats, as may be desired by such individual. In particular, bulletin board 404 differs from bulletin board 404 in that the former collects messages originated by the user ("fronga") whereas the latter collects messages originated by individuals other than the user. Similarly, bulletin board 406 collects messages selected by the user for reasons known to the user.

With particular reference to status boards 402, 402a, an advantageous feature of a preferred embodiment of the present disclosure is that users are able to work with their submissions to the budget and to submit those on a periodic basis for review and/or approval/consolidation into the enterprise's overall budget. Moreover, other users of the method/system disclosed herein are able to readily determine the status of such projects through exemplary status boards 402, 402a. Thus, with reference to status board 402, two informational columns are displayed: entity and status. Exemplary status board 402 provides information relevant to the European sales function and conveys the budget submission status of sales budgets for individual European countries, e.g., France (submitted), Italy (modeling) and Switzerland (review).

Typical status indicia that may be advantageously utilized according to the present disclosure include: modeling (the budget submission is a work in progress); submitted (the budget submission has been submitted to the appropriate management personnel for approval); review (the budget submission is being reviewed by the appropriate management personnel); and approved (the budget submission has been approved by the appropriate management personnel). Of note, the budget submission is preferably "locked," i.e., unavailable for further change by the submitter once the status reaches the "submitted" stage. The user who is preparing the budget submission determines when the status should be changed to the "submitted" stage, e.g., through a prompt when the document/schedule/spreadsheet is refreshed and/or uploaded to server 102. This functionality preferably permits the user involved in preparing a submission to control the point at which such submission is viewable by other participants in the budgeting process. When "approved," the individual budget submission is consolidated or "rolled up" into the enterprise's overall budget that takes form as individual submissions reach the approved stage. In a preferred embodiment, the enterprise's overall budget (and subparts thereof) are automatically consolidated from submissions made by individual users, regardless of budget submission status, thereby providing budget participants with a snapshot of the budget status at any given time in the development process.

With reference to status board 402a, the two information columns discussed with reference to status board 402 are repeated therein. However, additional columnar information is conveyed in status board 402a, namely columns entitled "responsible," "updated," and two icon columns. The first icon column provides information concerning hyperlinks to supporting documents associated with the budget submission, and the second icon column provides a direct link to an email/message posting wizard associated with the method/system of the present disclosure. As described hereinabove, a user of the method/system of the present disclosure has the ability to modify his/her screen views, subject to certain administrative controls, so as to view those aspects of the budgeting process of particular interest. Thus, in exemplary screen view 400, the user has opted to devote two screen blocks to information concerning the status of various budget submissions, evidencing the importance of such status information to this user.

As is readily apparent, the "responsible" and "updated" columns provide information concerning the individual assigned responsibility for preparing/submitting the subject budget documents (e.g., "MGRCH" for Switzerland) and the date such budget document was last updated (e.g., "Apr. 18, 2000" for Switzerland), respectively. From status board 402a, it is immediately apparent that the sales budget for Italy has not yet been submitted by the responsible individual ("MRGIT"), but that such Italian budget submission is in the "modeling" process. It is also apparent that the European budget submission, which is likely, at least in part, a consolidation of the individual European budget submissions, is also at the modeling stage, although a first version was uploaded to server 102 on Apr. 17, 2000. If a user of the method/system disclosed herein was concerned about the status of the Italian budget submission, an immediate email/message could be directed to "MRGIT" by clicking on the associated icon in status board 402a, thereby using browser 110 to facilitate immediate communications related thereto.

With reference to the supporting document icons depicted on status board 402a of screen view 400, two of the illustrative budget submissions include supporting document icons, namely the French and Swiss submissions. Supporting documents may constitute any file, document or other information source deemed worthwhile by the originator of the submission, and may be linked to the submission as a whole or to individual cells and/or aspects of a submission, e.g., a specific cell or dimension of a submitted spreadsheet. Thus, the originator of a budget submission may advantageously and easily include word processing document(s), ancillary and supporting spreadsheet(s), PowerPoint presentation(s), graphic, audio and/or video file(s), hyperlinks to information on the Internet and/or World Wide Web, and the like, to his/her budget submission, thereby ensuring an informed evaluation of the contents thereof.

The advantages associated with facilitating the inclusion of such supporting documentation with a budget submission, and even more advantageously, facilitating the linkage of supporting documentation to individual cells and/or aspects of a budget submission are significant. Behind every budget submission are countless exercises, expectations, assumptions, objectives, rationales and competing interests. These factors generally cannot be conveyed in the numbers alone, and are often lost as the budget submission works its way through the budgeting process, e.g., to members of the senior management team. Facilitating linkage of such supporting documentation to the budget submission makes it possible for each budget contributor to communicate these factors, and provides a source of valuable background information in evaluating performance metrics as actual performance against the final budget commences.

An exemplary screen view 500 associated with submission of supporting document 502 is provided in FIG. 5. Supporting document 502 is entitled "Supporting Schedule—Salary and Fringe Detail By Employee" and reflects, in spreadsheet form, employee-by-employee information concerning personnel within the Swiss sales organization. As further depicted in FIG. 5, the "Submit Supporting Document" function has been accessed in menu 504 from toolbar 506, according to the method/system of the present disclosure. Submission of supporting document 502 preferably entails completion of submission screen 508 by which the submitter confirms the title of supporting document 502, the caption to be assigned supporting document 502 for purposes of communications related thereto, a description thereof, and recipients of the supporting documentation. Thus, the submitter has the ability to limit distribution of supporting document 502 to personnel having a potential need and/or interest in review thereof. Moreover, the submitter is provided the option of notifying distribution recipient(s) that of supporting document 502 has been submitted to the system disclosed herein. Preferably, a document board is available for screen view by participants in the budgeting process, such document board providing a centralized list of supporting documentation that has been submitted in connection with the budget process.

Figure 7:
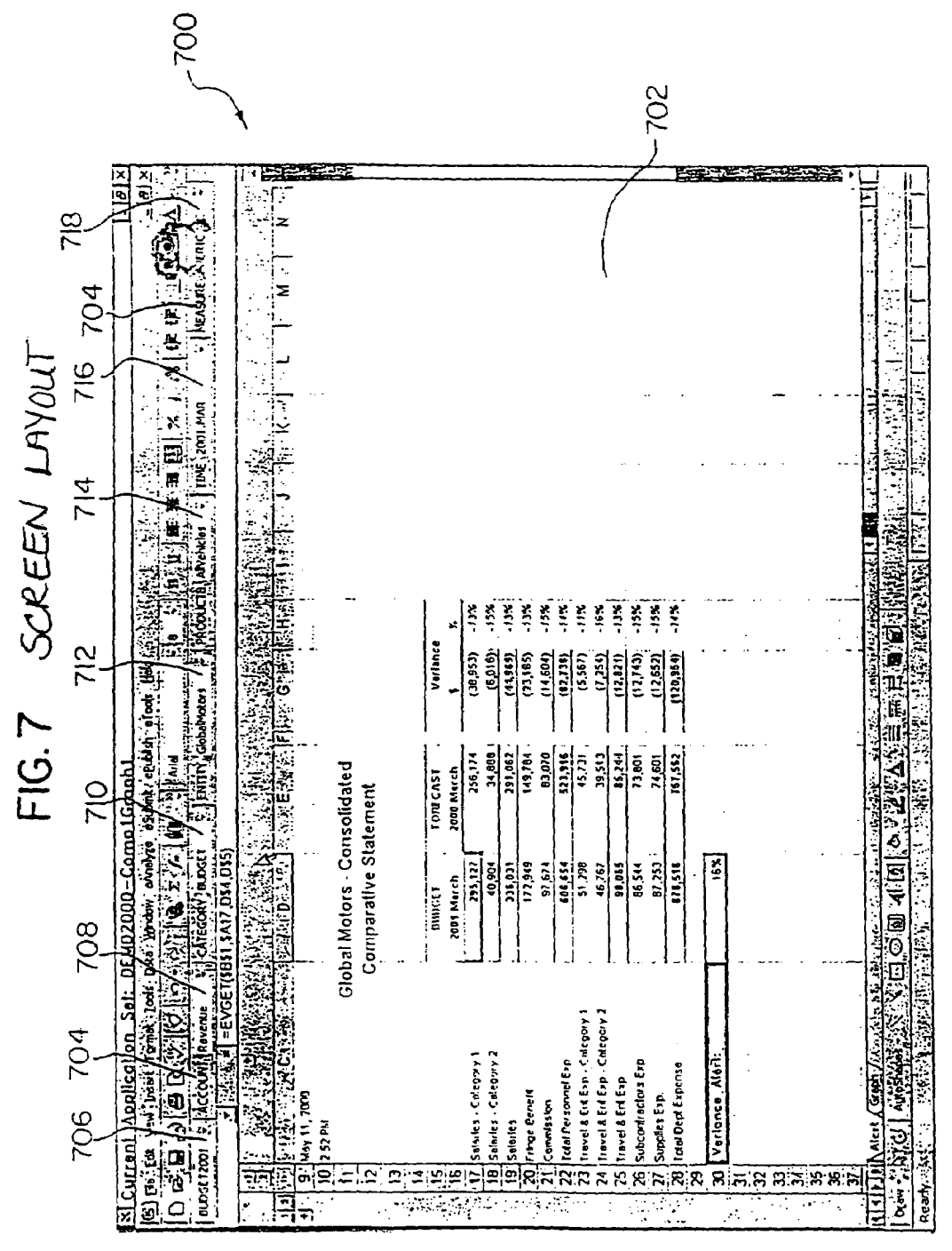

Turning to FIGS. 6 and 7, exemplary screen views 600 and 700 are provided in which budget-related spreadsheets 602, 702 are depicted. While spreadsheets 602, 702 both relate to Global Motors' Budget 2001 effort, the two spreadsheets 602, 702 differ in the comparisons being made. More particularly, spreadsheet 602 compares "actual" figures as of March 2000 to "budget" figures through March 2001, whereas spreadsheet 702 compares the same "budget" figures through March 2001 to the "forecast" figures for March 2000. The variance calculations are derived from the respective comparisons, as is known in the art of spreadsheet design, operation and use.

Of note with respect to screen views 600, 700, the rendering of the columnar data contained therein is driven by the "current view" selections reflected in the current view toolbars 604, 704. The current view toolbars 604, 704 are central to the operation and use of the budgeting method/system of the present disclosure in that the retrieval of data, e.g., from database 114, enterprise source 116 and/or the data cache of client 104, is based on the selections made therein. Accordingly, with reference to current view toolbar 604, the user has selected as his/her current view the "Budget2001 spreadsheet (block 606), the "Revenue" account (block 608), the "Actual" category (block 610), the "GlobalMotors" entity (block 612), the "AllVehicles" products (block 614), the "2001.Mar" time (block 616), and the "Periodic" measure (block 618). The user's current view, as reflected in current view toolbar 604, determines the appropriate data to be accessed, retrieved and loaded into the spreadsheet engine for rendering of spreadsheet 602. Of note, the key cache of client 104 advantageously determines the degree to which data required to render spreadsheet 602 is contained within the data cache, formulates a single request/query to be transmitted to server 102 across network 106 to obtain data not contained within the data cache, and loads data retrieved from server 102 into the data cache upon receipt thereof, as described hereinabove. The formatting of spreadsheet 602 is preferably predetermined according to the present disclosure, although a user's ability to design specialized/customized spreadsheets based on conventional spreadsheet technology is contemplated according to the present disclosure.

Turning to spreadsheet 702 depicted in screen view 700, the user's sole change to his/her current view relative to screen view 600 is the selection of the "Budget" category in block 710 based on drop down menu 620 depicted in FIG. 6. The remaining fields/dimensions of the user's current view remain unchanged in current view toolbar 704 relative to current view toolbar 604. However, based on the single change to block 610, 710, the spreadsheet engine automatically renders an altogether different spreadsheet 702. Moreover, the selections contained in the remaining, unchanged current view blocks 706, 708, 712, 714, 716, 718 define the data that must be accessed by client 104 for the rendering of spreadsheet 702. The defining aspects of the unchanged current view blocks advantageously limit the amount of information/data to be retrieved by client 102. For example, absent the "GlobalMotors" entity limitation in blocks 612, 712, client 102 would potentially seek to retrieve information/data associated with a host of entities not required to render the desired spreadsheet. The automatic narrowing of the data retrieval request based on the user's selections in the current view toolbar 604, 704 greatly improve the speed, reliability and efficacy of the method/system of the present disclosure. Indeed, the "current view" functionality together with the Web-based, browser driven application design described herein, effectively transform static spreadsheets into dynamic, reusable reports that leverage and significantly enhance a user's ability to "slice and dice" data to arrive at beneficial financial results.

According to the method/system of the present disclosure, a series of advantageous functional commands may be utilized to retrieve, send and display specific data, thereby enhancing the power and flexibility thereof. These functional commands may be used in conjunction with cell/dimension references within a spreadsheet, to make a report or screen view behave in a certain way. Advantageous functional commands that may be used according to the present disclosure are as follows:

| Functional Command | Meaning | Function |
|---|---|---|
| EvAPP( ) | App = application | Returns current application identification |
| EvBET(Application, AccountMember, Cell1, Cell2) | Better/ (Worse) | Performs a better or worse comparison of two values, based on the account type property of the account number |
| EvDES([dimension,] Member ID) | Description | Returns description for the specified member. If the same member name is used in more than one dimension, the dimension must be specified. |
| EvDIM (Application, dimType) | Dimension | Retrieves the property "DimName" from tblDimension. Its parameters are "AppName" and "dimType" |
| EvGET(Application. [dim.]member1, [dim.]member2, ..., [dim.]memberN) | Get value | Retrieves a data value based on the specific members. If the same member name is used in more than one dimension, the dimension must be specified. |
| EvINP(Application, member1, member2, ..., memberN, Value) | Input value | Allows input into the cell containing the formula and then sends that input to the server when the eSubmit/Refresh schedules command is selected. |
| EvCV(Application, Dimension) | Current view | Returns the current view setting for the specified dimension. |
| EvPRO(Application, Member, Property) | Property | Returns the value of a given property of a member. |

-continued

| Functional Command | Meaning | Function |
|---|---|---|
| EvSND(Value Reference, Application, Dim1, Dim2, . . . , DimN) | Send value | References another cell and sends the value in that cell to the server when the eSubmit/Refresh Schedules command is selected. The parameters specify the dimensions that identify where the data is to be sent in the database. |

While the present disclosure includes a description of the method and system with reference to various specific embodiments, those skilled in the art will readily appreciate that various modifications, chances and enhancements may be made thereto without departing from the spirit or scope of the invention as defined by the appended claims.

What is claimed is:

1. A system for facilitating efficient database-related information exchanges across a network, the system comprising:
a client computer in communications with a network, the client computer comprising:
memory; and
a processor at least partially executing a spreadsheet-based application program configured to:
receive a request for data associated with a spreadsheet-based application program;
determine whether data responsive to the request is available in the memory of the client computer;
if data responsive to the request is not entirely available in the memory at the client computer, store the request until at least one additional request for data associated with the spreadsheet-based application program is received;
combine the stored request with the at least one additional request for data to form a single query;
transmit the single query to a server across the network requesting the data associated with the stored request and the at least one additional request;
receive the data responsive to the single query from the server across the network in response to transmitting the single query; and render at least part of a spreadsheet based on the data received.

2. The system of claim 1, wherein the processor is further configured to render at least part of the spreadsheet based on the data responsive to the requests that is available in the memory of the client computer and data received in response to the single query.

3. The system of claim 1, wherein the server accesses a centralized data and document repository.

4. The system of claim 1, wherein the processor is further configured to store the data received in response to the single query in a cache.

5. The system of claim 4, wherein the data responsive to the single query is stored in the cache before providing the data to the spreadsheet-based application program for use in rendering the at least one spreadsheet.

6. The system of claim 1, wherein the processor is further configured to verify that a user of the client computer has authorization before providing the data responsive to the single query to the client computer.

7. The system of claim 1, wherein the spreadsheet-based application program is operable in the absence of communications with the server across the network.

8. The system of claim 7, wherein, in the absence of communication with the server across the network, the spreadsheet-based application program uses data stored in a cache to render at least part of the spreadsheet.

9. A method for facilitating efficient database-related information exchanges across a network, the method comprising:
providing a spreadsheet-based application program at a client computer, the client computer being in communication with the network;
receiving a request for data associated with the spreadsheet-based application program;
determining whether data responsive to the request is available at the client computer;
if data responsive to the request is not entirely available in the client computer, storing the request until at least one additional request for data associated with the spreadsheet-based application program is received;
combining the stored request with the at least one additional request for data to form a single query;
transmitting the single query to a server across the network requesting the data associated with the stored request and the at least one additional request;
receiving the data at the client computer that is responsive to the single query, wherein the data is received across the network; and
rendering at least part of a spreadsheet based on the data received.

10. The method of claim 9, further comprising rendering the at least part of the spreadsheet based on data responsive to the requests that is available at the client computer and data received in response to the single query from across the network.

11. The method of claim 9, further comprising storing the data received in response to the single query in a cache.

12. The method of claim 11, wherein the data responsive to the single query is stored in the cache before providing the data to the spreadsheet-based application program for use in rendering the at least one spreadsheet.

13. The method of claim 9, further comprising verifying that a user of the client computer has authorization before providing the data responsive to the single query to the client computer.

14. The method of claim 9, wherein the spreadsheet-based application program is operable in the absence of communications across the network.

15. The method of claim 14, wherein, in the absence of communication across the network, the spreadsheet-based application program uses data stored in a cache to render the spreadsheet.

* * * * *